(12) United States Patent
Ohtsu et al.

(10) Patent No.: US 7,272,135 B1
(45) Date of Patent: Sep. 18, 2007

(54) GATEWAY APPARATUS

(75) Inventors: Kazuyuki Ohtsu, Kawasaki (JP); Hiroko Suzuki, Kawasaki (JP); Masayuki Tashiro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/431,902

(22) Filed: Nov. 2, 1999

(30) Foreign Application Priority Data

Feb. 19, 1999 (JP) ................................. 11-041263

(51) Int. Cl.
*H04L 12/66* (2006.01)
(52) U.S. Cl. .................. 370/356; 370/352; 370/389; 370/401
(58) Field of Classification Search .............. 370/351, 370/352, 353, 357, 395.1, 395.5, 400, 401
See application file for complete search history.

(56) References Cited

U.S. PATENT DOCUMENTS

| | | | | |
|---|---|---|---|---|
| 5,956,673 | A * | 9/1999 | Weaver et al. ............... | 704/221 |
| 6,125,120 | A * | 9/2000 | Lehtimaki ................... | 370/435 |
| 6,134,242 | A * | 10/2000 | Aftelak ....................... | 370/465 |
| 6,167,040 | A * | 12/2000 | Haeggstrom ................ | 370/352 |
| 6,256,612 | B1 * | 7/2001 | Vo et al. ...................... | 704/500 |
| 6,324,409 | B1 * | 11/2001 | Shaffer et al. .............. | 455/552 |
| 6,356,545 | B1 * | 3/2002 | Vargo et al. ................ | 370/355 |
| 6,577,637 | B1 * | 6/2003 | Sieppi ......................... | 370/401 |
| 6,600,740 | B1 * | 7/2003 | Valentine et al. ........... | 370/365 |
| 6,975,624 | B1 * | 12/2005 | Oda et al. ................... | 370/354 |

FOREIGN PATENT DOCUMENTS

| | | |
|---|---|---|
| JP | 6-244933 | 9/1994 |
| JP | 10-164134 | 6/1998 |
| JP | 10-164135 | 6/1998 |
| JP | 10-164144 | 6/1998 |
| WO | WO 00/54529 | * 9/2000 |
| WO | WO 01/86930 | * 11/2001 |

OTHER PUBLICATIONS

Notice Of Reason for Rejection dated Nov. 16, 2004, with translation.
Shigeyuki Sekesawa, et al. "Control Function" The Journal of the Institute of Image Information and Television Engineers, vol. 52, No. 12, pp. 1769-1773, Dec. 20, 1998.

* cited by examiner

*Primary Examiner*—Wing Chan
*Assistant Examiner*—Robert C Scheibel
(74) *Attorney, Agent, or Firm*—Katten Muchin Rosenman LLP

(57) ABSTRACT

A gateway apparatus according to the present invention, arranged between each of a plurality of circuit switched networks and the Internet, for transmitting data received from each of the circuit switched network to the Internet. The gateway apparatus comprises an expansion section expanding compressed data received from the circuit switched network, a compression section compressing the data expanded by the expansion section, a setting section setting a compression form, including a transmission rate on the internet protocol network, of data compressed by the compression section, and a controller transmitting the compressed data to the internet protocol network without performing expansion/compression processes by the expansion section and the compression section when the compressed data can be expanded by another gateway apparatus which should receive the compressed data and when a transmission rate on the circuit switched network of the compressed data is not higher than a transmission rate set by the setting section.

5 Claims, 6 Drawing Sheets

GATEWAY APPARATUS

BACKGROUND OF THE INVENTION

1. Field of the Invention

The present invention relates to a gateway apparatus arranged between a circuit switched network and an internet protocol network (IP network) to repeat data transmitted/received between circuit switched networks through the IP network.

2. Description of the Prior Art

As one communication technology of sound (audio) data, the sound data is transmitted through an IP network such as the Internet or an intranet. This technology is called voice over IP (VoIP) connection. Application software or a system according to the VoIP connection is called an internet telephony (IT).

An internet telephony gateway apparatus (to be referred to as a "gateway" hereinafter), having a gateway function which performs protocol conversion between a circuit switched network such as a telephone network and an IP network, for realizing two-way communication between the circuit switched network and the IP network. An internet telephony system (IT system) for repeating data between circuit switched networks by using the gateway are realized. The IT system rapidly spread because communication charge of the IT system cheaper than communication charge of a conventional system using only the telephone network.

In the IT system described above, when communication of sound data is performed between circuit switched networks, the gateways set a communication channel for forming a connection in which corresponds to a call between the circuit switched networks, on an IP network. The sound data is transferred by using the set communication channel. The communication channel is set such that gateways on an call-out side and an call-in side execute a procedure (to be referred to as an "H. 323 procedure" hereinafter) based on H. 323 protocol. The H. 323 protocol is communication protocol corresponding to VoIP recommended by recommended by ITU-T (International telecommunication Union-Telecommunication).

The H. 323 procedure comprises (1) a basic call connection procedure based on H. 225 protocol, (2) a capability exchange procedure between gateway apparatuses based on H. 245 protocol, and (3) a connection procedure of an sound communication channel (sound channel). Upon completion of these three procedures, transmission/reception (sound communication) of sound data between terminal devices accommodated in circuit switched networks is started.

Figure 5:
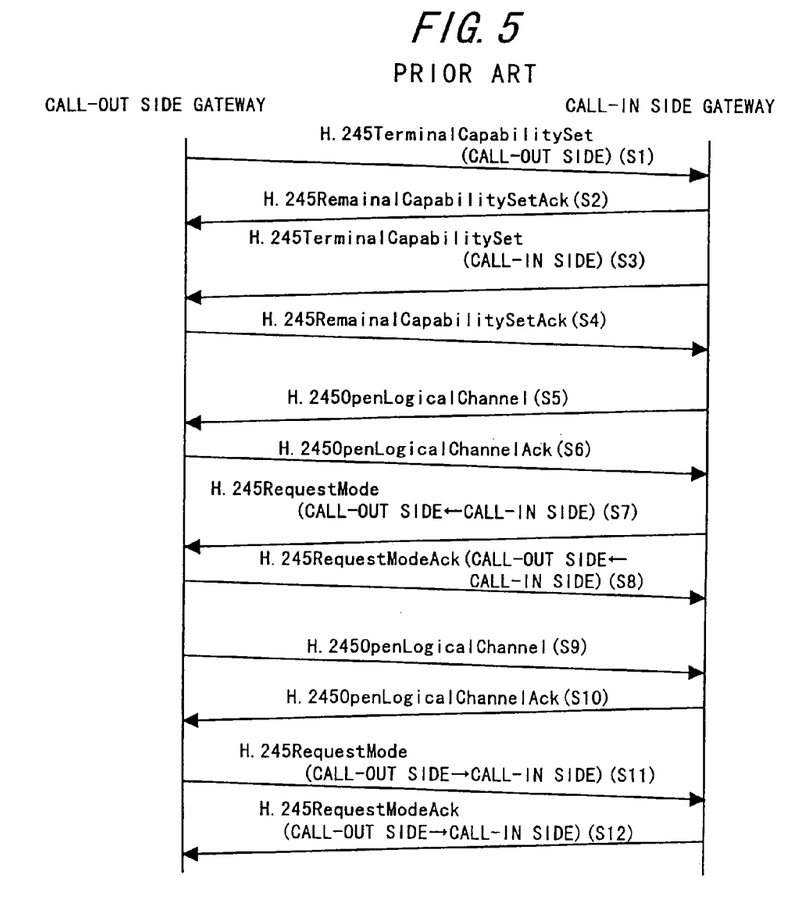
FIG. 5 is a sequence chart showing a capability exchange procedure based on H. 225.

The capability exchange procedure based on the H. 245 protocol is performed as shown in FIG. 5. First, a gateway on a call-out side (call-out side gateway) transmits a message (H. 245 Terminal Capability Set (call-out side)) including the capability information of the gateway apparatus (step S1). The capability information includes, for example, a CODEC form (including compression/expansion form and transmission rate).

When a gateway on a call-in side (call-in side gateway) receives a message including the capability information of the call-out side gateway, after the call-in side gateway transmits a massage of an acknowledge (H. 245 Remainal Capability Set Ack) (step S2), and the call-in side gateway transmits a message (H. 245 Terminal Capability Set (call-in side)) including the capability information of the call-in side gateway (step S3).

When the call-out side gateway receives the message including the capability information of the call-in side gateway, the call-out side gateway transmits an acknowledge message (H. 245 Remainal Capability Set Ack) of the message (step S4). In this manner, the capability information is exchanged between the gateways.

Thereafter, when the call-in side gateway receives the acknowledge message from the call-out side gateway, the call-in gateway transmits a connection message (H. 245 Open Logical Channel) of a control channel related to H. 245 (step S5).

When the call-out side gateway receives the connection message, the call-out side gateway transmits an acknowledge message (H. 245 Open Logical Channel Ack) of the connection message (step S6). In this manner, a connection channel related to H. 245 in a downward direction (call-out side←call-in side direction) is set between the gateways.

Thereafter, when the call-in side gateway receives the acknowledge message from the call-out side gateway, the call-in side gateway compares the capability information received from the call-out side gateway with the capability information of the call-in side gateway, extracts capability information which can be mutually executed by the call-in side gateway and the call-out side gateway, and selects one the extracted capability information. For example, when a plurality of CODEC forms which can be mutually executed by the call-out side gateway and the call-in side gateway are extracted, one of the plurality of CODEC forms is selected. Thereafter, the call-in side gateway transmits a message (H. 245 Request Mode (call-out side←call-in side)) including the selected capability information (selection result) (step S7).

When the call-out side gateway receives the message including the selection result, after the call-out side gateway transmits an acknowledge message (H. 245 Request Mode Ack (call-out side←call-in side)) of the message (step S8), the call-out side gateway transmits a connection message (H. 245 Open Logical Channel) of a control channel related to H. 245 (step S9).

When the call-in side gateway receives the connection message, the call-in side gateway transmits an acknowledge message (H. 245 Open Logical Channel Ack) of the connection message (step S10). In this manner, a connection channel related to H. 245 in an upward direction (call-out side→call-in side direction) is set between the gateways.

Thereafter, when the call-out side gateway receives the acknowledge message from the call-in side gateway, like the call-in side gateway, the call-out side gateway compares the capability information received from the call-in side gateway with the capability information of the call-out side gateway, extracts capability information which can be mutually executed by the call-in side gateway and the call-out side gateway, and selects one the extracted capability information. Thereafter, the call-out side gateway transmits a message (H. 245 Request Mode (call-out side→call-in side)) including the selection result (step S11).

When the call-in side gateway receives the message including the selection result, the call-in side gateway transmits an acknowledge message (H. 245 Request Mode Ack (call-out side→call-in side)) of the message (step S12). The acknowledge message is received by the call-out side gateway.

With the procedures described above, the call-out side gateway and the call-in side gateway exchange the capabilities and select one of capabilities (CODEC form and the like) which can be mutually executed by the call-out side gateway and the call-in side gateway to allocate the selected capability to sound channels in the upward direction and the downward direction.

In this manner, after each gateway sets a CODEC form or the like, sound channels in the upward direction and the downward direction are set. When each gateway receives sound data, the gateway expands and compresses the received sound data according to the set CODEC form, and transmits the sound data at a set transmission rate.

In the capability exchange procedure described above, the gateway respectively select CODEC forms from capabilities which can be selected. More specifically, when each gateway selects a CODEC form related to an sound channel set on an IP network, the gateway does not considers the CODEC form of sound data received from the upstream side (circuit switched network) of the gateway. When each gateway selects a CODEC form related to sound data to be transmitted to a circuit switched network, the gateway does not consider a CODEC form related to a communication channel on the upstream side (IP network) of the gateway.

Figure 6:
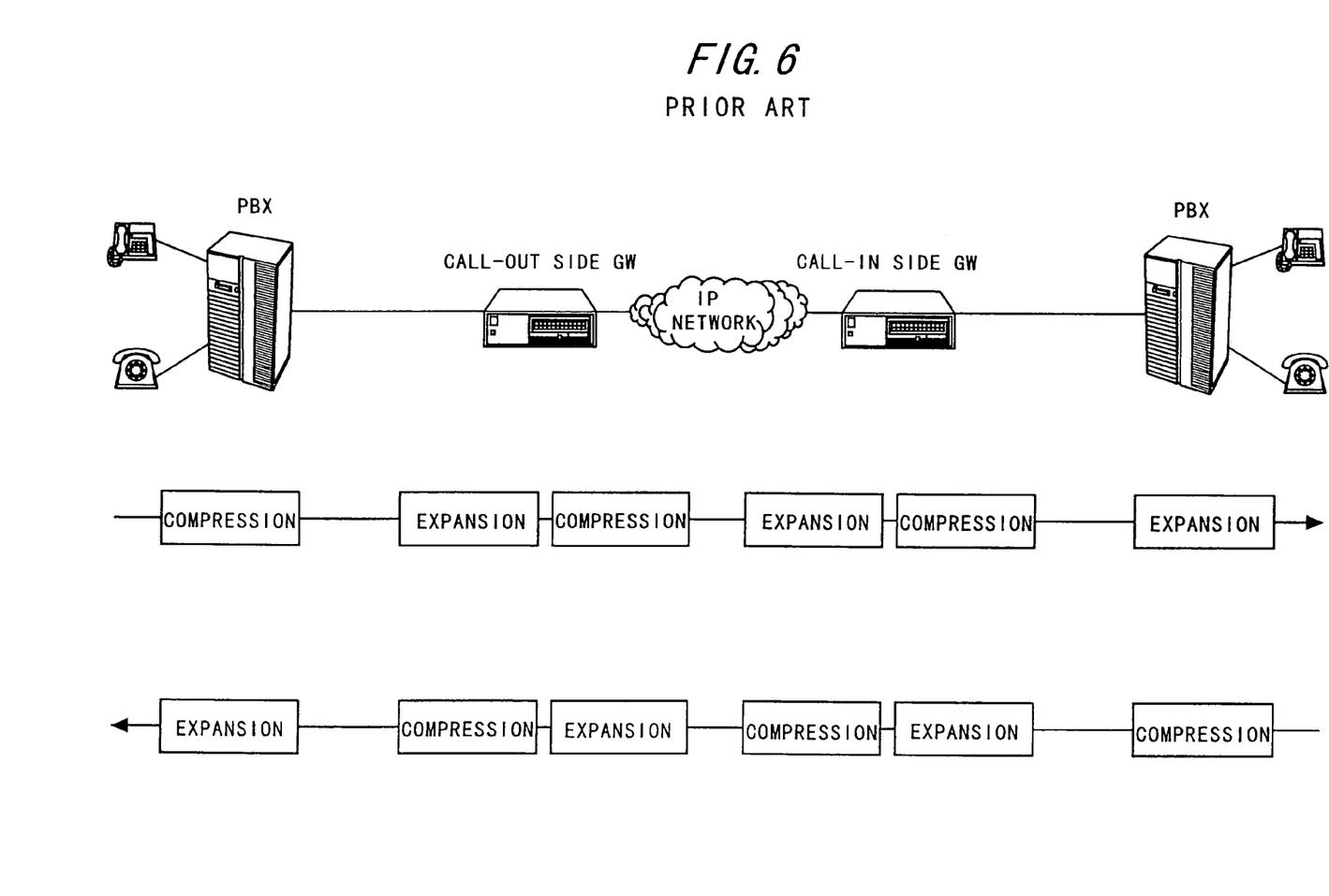
FIG. 6 is a diagram for explaining conventional problems.

For this reason, when each gateway selects a CODEC form different from the CODEC form on the upstream side, as shown in FIG. 6, if sound data which is compressed by the circuit switched network (shown as a private branch exchange (PBX)) on the input side is received, the corresponding gateway expands the compressed data, compresses the expanded sound data in a different compression form, and transmits the compressed sound data to the IP network. A gateway which receives the compressed sound data from the IP network expands the compressed sound data, compresses the expanded sound data in a different compression form, and transmits the compressed sound data to a circuit switched network (PBX).

Since each gateway independently decides the CODEC form of sound data, if the CODEC form on the reception and transmission sides of the gateway coincide with each other, as in the above description, the gateway performs expansion/compression of sound data.

The fact described above is one of factors that extend time required to transmit sound data between terminal devices connected to circuit switched networks. A case wherein a gateway apparatus performs an unnecessary expansion/compression process may occur.

SUMMARY OF THE INVENTION

It is an object of the present invention to provide a gateway apparatus which can shorten transmission time of sound data.

The first aspect of the present invention provides a gateway apparatus, arranged between each of a plurality of circuit switched networks and an internet protocol network, for transmitting data received from each of the circuit switched networks to the internet protocol network, comprises: an expansion section expanding compressed data received from the circuit switched network; a compression section compressing the data expanded by the expansion section; a setting section setting a compression form, including a transmission rate on the internet protocol network, of data compressed by the compression section; and a controller transmitting the compressed data to the internet protocol network without being subjected to expansion/compression processes by the expansion section; and the compression section when the compressed data can be expanded by another gateway apparatus which should receive the compressed data and when a transmission rate on the circuit switched network of the compressed data is not higher than a transmission rate set by the setting section.

According to the first aspect, when a transmission rate of data on the input side of the gateway apparatus is not less than a transmission rate of data on the output side, an expansion/compression process in the gateway apparatus is omitted. For this reason, time required for data transmission can be shortened.

In this case, the internet protocol network is a network using IP (internet protocol) as communication protocol of a layer 3, and includes the Internet or intranets.

The second aspect of the present invention provides a gateway apparatus, arranged between each of a plurality of circuit switched networks and an internet protocol network, for transmitting data received from the internet protocol network to each of the circuit switched networks, comprises: an expansion section expanding compressed data received from the internet protocol network; a compression section compressing the data expanded by the expansion section; a setting section setting a compression form, including a transmission rate on the circuit switched network, of data compressed by the compression section; and a controller transmitting the compressed data to the circuit switched network without being subjected to expansion/compression processes by the expansion section and the compression section when the compressed data can be expanded by on a circuit switched network which should receive the compressed data and when a transmission rate on the internet protocol network of the compressed data is not higher than a transmission rate set by the setting section.

According to the second aspect, as in the first aspect, since an expansion/compression process can also be omitted in the gateway apparatus, time required for data transmission can be shortened.

The third aspect of the present invention provides a network system including a first gateway apparatus to which a first circuit switched network is connected, a second gateway apparatus to which a second circuit switched network is connected, and an internet protocol network to which the first gateway apparatus and the second gateway apparatus are connected. In the network system, the first gateway apparatus comprises: a notification section giving information of a CODEC form of compressed data transmitted from the first circuit switched network to the first gateway apparatus to the second gateway apparatus as CODEC information when compressed data is transmitted from the first circuit switched network to the second circuit switched network through the internet protocol network; and a selection section selecting a compression form of the compressed data transmitted from the first gateway apparatus to the second gateway apparatus from information of CODEC forms which are received from the second gateway apparatus and can be executed by the second gateway apparatus. The second gateway apparatus comprises: an expansion section expanding the compressed data received from the first gateway apparatus; a compression section compressing data expanded by the expansion section; a determination section, when a CODEC form corresponding to the CODEC information received from the notification section can be executed by the second gateway apparatus and when compressed data compressed in the CODEC form can be expanded by the second circuit switched network, determining a compression form corresponding to the CODEC information as a compression form of compressed data transmitted from the second gateway apparatus to the second circuit switched network; a second notification section giving only information of the CODEC form determined by the determination section to the first gateway apparatus as information of a CODEC form which can be executed by the second gateway apparatus; and a controller transmitting the compressed data received from the first circuit switched network to the internet protocol network without being subjected to expansion/compression processes by the expansion section and the compression section when the compression form, which is selected and set by the selection section, of the compressed data transmitted from the first gateway apparatus to the second gateway apparatus coincides with the compression form, which is determined by the determination section, of the compressed data transmitted from the second gateway apparatus to the second circuit switched network.

According to the third aspect, since an expansion/compression process in the second gateway apparatus can also be omitted, transmission time of data can be shortened.

The fourth aspect of the present invention is specified as follows. That is, the first gateway apparatus according to the third aspect further comprises: a second expansion section expanding compressed data received from the first circuit switched network; a second compression section compressing the data expanded by the second expansion section; and a second controller transmitting the compressed data received from the first circuit switched network to the internet protocol network without being subjected to expansion/compression processes by the expansion section and the compression section when the compression form of the compressed data transmitted from the first circuit switched network to the first gateway apparatus coincides with the compression form, which is selected by the selection section, of the compressed data transmitted from the first gateway apparatus to the second gateway apparatus.

According to the fourth aspect, since an expansion/compression process can be omitted also in the first gateway apparatus, transmission time of data between the first circuit switched network and the second circuit switched network can be made shorter than that in the present invention according to the third aspect.

The fifth and sixth aspects of the present invention are specified as follows. That is, when the determination section according to the third and fourth aspect cannot determine a CODEC form corresponding to the CODEC information received from the notification section as a compression form of compressed data transmitted from the second gateway apparatus to the second circuit switched network, the determination section determines a CODEC form of data which can be executed by the second gateway apparatus and expanded by the second circuit switched network as the compression form of the compressed data transmitted from the second gateway apparatus to the second circuit switched network, and the second notification section gives, of the CODEC form notified by the notification section and the CODEC form determined by the determination section, only information of the CODEC form in which the transmission rate of the compressed data is low to the first gateway apparatus as information of a CODEC form which can be executed by the second gateway apparatus.

According to the fifth and sixth aspects, in the first gateway apparatus or the second gateway apparatus, an expansion/compression process of data can be omitted.

The seventh aspect of the present invention provides a communication device in which a low-order network and a high-order network are connected to each other, comprising: an expansion section expanding compressed data received from the low-order network; a compression section compressing the data expanded by the expansion section; a setting section setting a compression form, including a transmission rate on the high-order network, of data compressed by the compression section; and a controller transmitting the compressed data to the high-order network without performing of expansion/compression processes by the expansion section and the compression section when a transmission rate of the compressed data on the low-order network is not higher than the transmission rate set by the setting section.

The eighth aspect of the present invention provides a communication device in which a high-order network and a low-order network are connected to each other, comprising: an expansion section expanding compressed data received from the high-order network; a compression section compressing the data expanded by the expansion section; a setting section setting a compression form, including a transmission rate on the low-order network, of data compressed by the compression section; and a controller transmitting the compressed data to the low-order network without being subjected to expansion/compression processes by the expansion section and the compression section when a transmission rate of the compressed data on the high-order network is not higher than the transmission rate set by the setting section.

DETAILED DESCRIPTION OF THE PREFERRED EMBODIMENT

Embodiment of the present invention will be described below with reference to the accompanying drawings.

<<Entire Configuration of Network System>>

Figure 1:
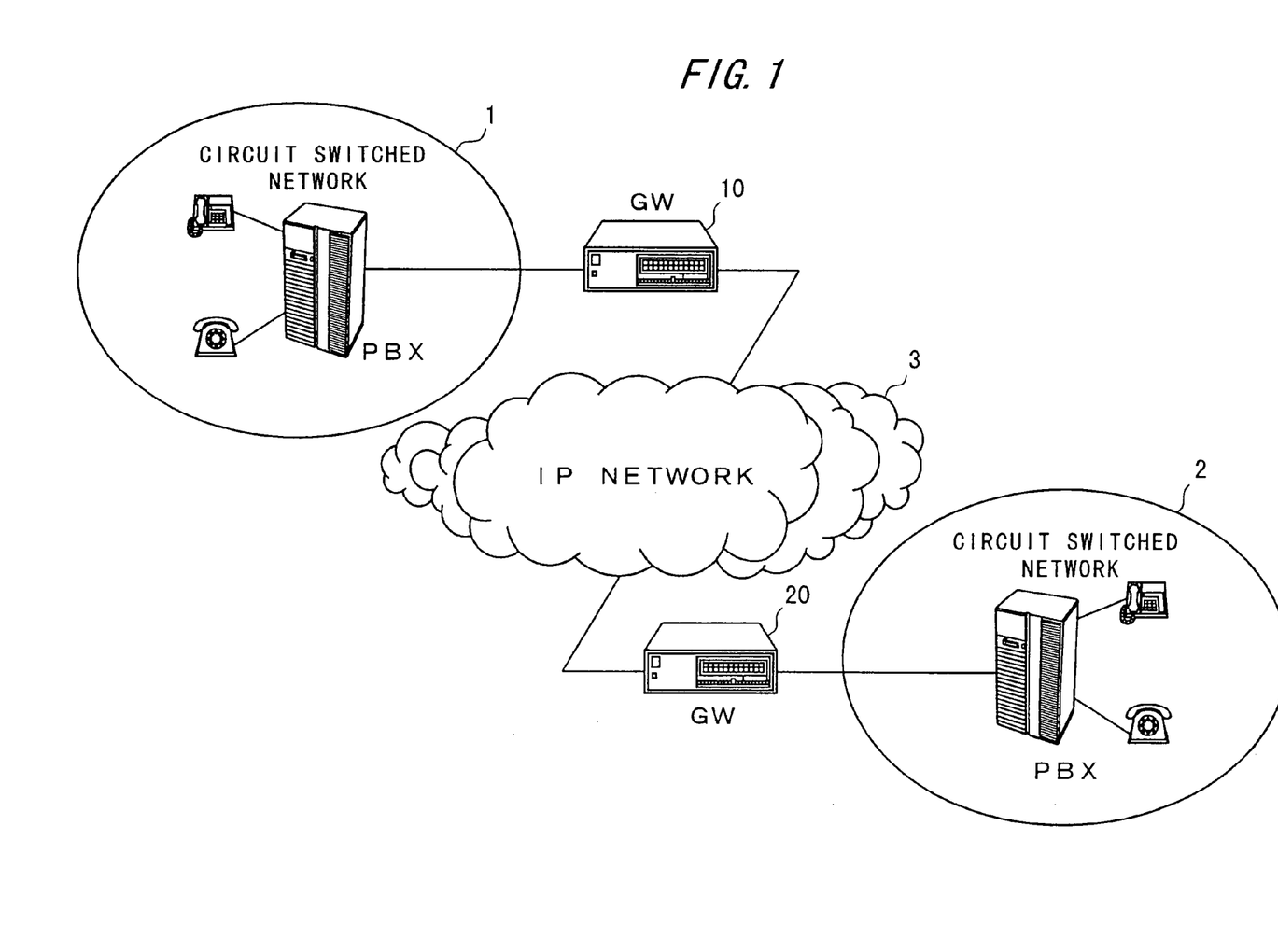
FIG. 1 is a diagram showing an entire configuration of a network system to which a gateway apparatus according to an embodiment of the present invention is applied.

FIG. 1 is a diagram showing the entire configuration of a network system (IT system) to which gateway apparatuses (to be referred to as a "GW" hereinafter) 10 and 20 according to the embodiment of the present invention are applied. The network system shown in FIG. 1 is a complex network in which a circuit switched network 1 and a circuit switched network 2 are connected to an IP network 3 through the GW 10 and GW 20, respectively. For example, the IP network 3 is the Internet or an intranet, and is constituted by using a LAN or a WAN.

In FIG. 1, each of the circuit switched networks 1 and 2 is a telephone network, and is constituted by a PBX in which a plurality terminal devices (telephone sets) are connected. Each of the circuit switched network 1 and 2 are connected to the GW 10 or the GW 20. Each of the circuit switched networks 1 and 2 may be constituted by a plurality of PBXs in which a single terminal device or a plurality of terminal devices are stored.

Each of the PBXs in the circuit switched networks 1 and 2 controls sound communication between terminal devices (low-order terminals) connected to the PBX on a circuit switched network to which the PBX belongs. When a call setting request (call-out request) received from the low-order terminal requests communication with a terminal device which belongs to another circuit switched network, each PBX transmits the call setting request to a GW (high-order GW) connected to the PBX. Thereafter, the PBX transmits sound data received from the low-order terminal which transmits the call setting request to the high-order GW. On the other hand, when each PBX receives a call setting request (call-in request) from the high-order GW, the PBX causes a low-order terminal corresponding to a target place to perform call-in side of a call corresponding to the call-in request. Thereafter, the PBX transmits the sound data received from the high-order GW to the low-order terminal.

The GWs 10 and 20 are connected to the IP network 3 through a physical circuit to perform a call setting process between circuit switched networks connected through the IP network 3. When each of the GWs 10 and 20 receives a call setting request (call-out request) from a PBX (low-order PBX) connected to the corresponding GW, the corresponding GW sets a logical communication channel (logical channel) for sound communication between another GW corresponding to a destination point of the call setting request and the corresponding GW on the IP network 3. Thereafter, the corresponding GW transmits sound data received from a low-order PBX through the logical channel to the other GW.

On the other hand, when each of the GWs 10 and 20 receives a call setting request (call-in request) from another GW, the corresponding GW sets a logical channel for sound data transmission between the other GW and the corresponding GW and transmits the call-in request to a low-order PBX. Thereafter, the corresponding GW transmits sound data received from the other GW through the set logical channel to the low-order PBX.

<<Configuration of Gateway Apparatus>>

Figure 2:
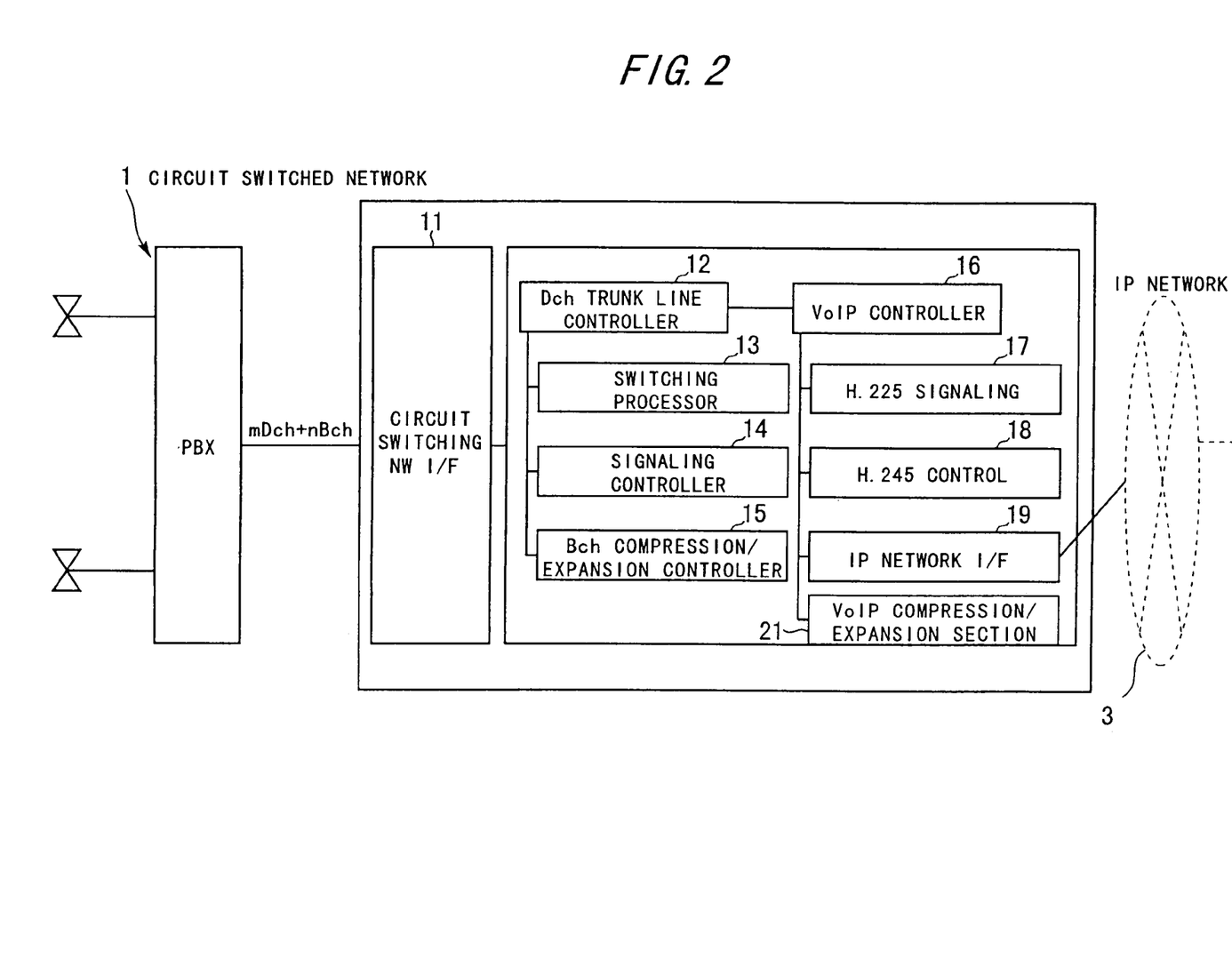
FIG. 2 is a functional block diagram of the gateway apparatus shown in FIG. 1.

FIG. 2 is a functional block diagram of each of the GWs 10 and 20 shown in FIG. 1. Since the GWs 10 and 20 have configurations which are almost identical with each other, a functional block diagram of the GW 10 is shown in FIG. 2 as an example.

In FIG. 2, the GW 10 is constituted by a circuit switched network interface (circuit I/F) 11, a D-channel trunk line controller 12, an switching processor 13, a signaling controller 14, a B-channel compression/expansion controller 15, a VoIP controller 16, an H. 225 signaling controller 17, an H. 245 controller 18, an IP network interface (IP I/F) 19, and a VoIP compression/expansion section 21.

The D-channel trunk line controller 12, the switching processor 13, the signaling controller 14, the B-channel compression/expansion section 15, the VoIP controller 16, the H. 225 signaling controller 17, the H. 245 controller 18, the IP I/F 19, and the VoIP compression/expansion section 21 are functions which are actually realized by a central control equipment (CC), a memory device constituted by a main memory (MM) or the like used as a position in which an operation area of the CC and a program are stored, and a peripheral device including a communication device such as a data channel device (DCH).

The circuit I/F 11 is connected to the circuit switched network 1 (PBX) through a plurality of communication circuits. The plurality of communication circuits are D-channel trunk lines constituted by m peace of D-channels (transfer channels for call control information) and n peace of B-channels (transfer channels for user information (sound data or the like)). The circuit I/F 11 is a D-channel trunk line I/F.

The D-channel trunk line controller 12 controls the circuit I/F 11, the switching processor 13, the signaling controller 14, and the B-channel compression/expansion section 15 to perform resource management related to D-channels and B-channels or state management of calls. The D-channel trunk line controller 12 incorporates with the VoIP controller 16 to realize protocol conversion/in-band connection between the circuit switched network 1 and the IP network 3.

The switching processor 13 controls a circuit channel switch to perform switching control (circuit acquisition or circuit releasing) or the like of the B channels and the D-channels accommodated in the circuit I/F 11.

The signaling controller 14 detects a change in state such as calling out or disconnection of a terminal device, and transmits/receives a selection signal (signal corresponding to a telephone number input from the terminal device).

The B-channel compression/expansion section 15 performs an expansion process of sound data received by the circuit I/F 11 through the B-channel according to a set CODEC form (including compression/expansion form and transmission rate). The B-channel compression/expansion section 15 performs a compression process of sound data transmitted to a predetermined B-channel through the circuit I/F 11.

The VoIP controller 16 controls the H. 225 signaling controller 17, the H. 245 controller 18, the IP I/F 19, and the VoIP compression/expansion section 21 to perform management of resources for H. 323 protocol conversion and state management of a call related to H. 323 protocol. The VoIP controller 16 incorporates with the D-channel trunk line controller 12 to realize protocol conversion/logical channel connection between the circuit switched network 1 and the IP network 3.

The H. 225 signaling controller 17 performs call control signaling according to H. 323 protocol between the H. 225 signaling controller 17 and an H. 323 end point (call-in side gateway).

The H. 245 controller 18 performs a capability exchange procedure (see FIG. 4) of a CODEC form or the like according to H. 245 protocol.

The IP I/F 19 is an interface section for transmitting/receiving a control packet in which a call control message is stored or an IP packet in which sound data is stored to/from the GW 20 through the IP network 3.

The B-channel compression/expansion controller 15 and the VoIP compression/expansion section 21 correspond to the expansion section and the compression section of the present invention, and the D-channel trunk line controller 12 and the VoIP controller 16 correspond to the setting section, the determination section, the selection section, and the controller of the present invention.

<<Operation of GW>>

The operation of each of the GWs 10 and 20 described above will be described below. For example, the operations of the GWs 10 and 20 in a case wherein the terminal device in the circuit switched network 1 show in FIG. 1 is used as a terminal device on a call-out side and the terminal device in the circuit switched network 2 is used as a terminal device on a call-in side will be described below.

<First Operation>

Figure 3:
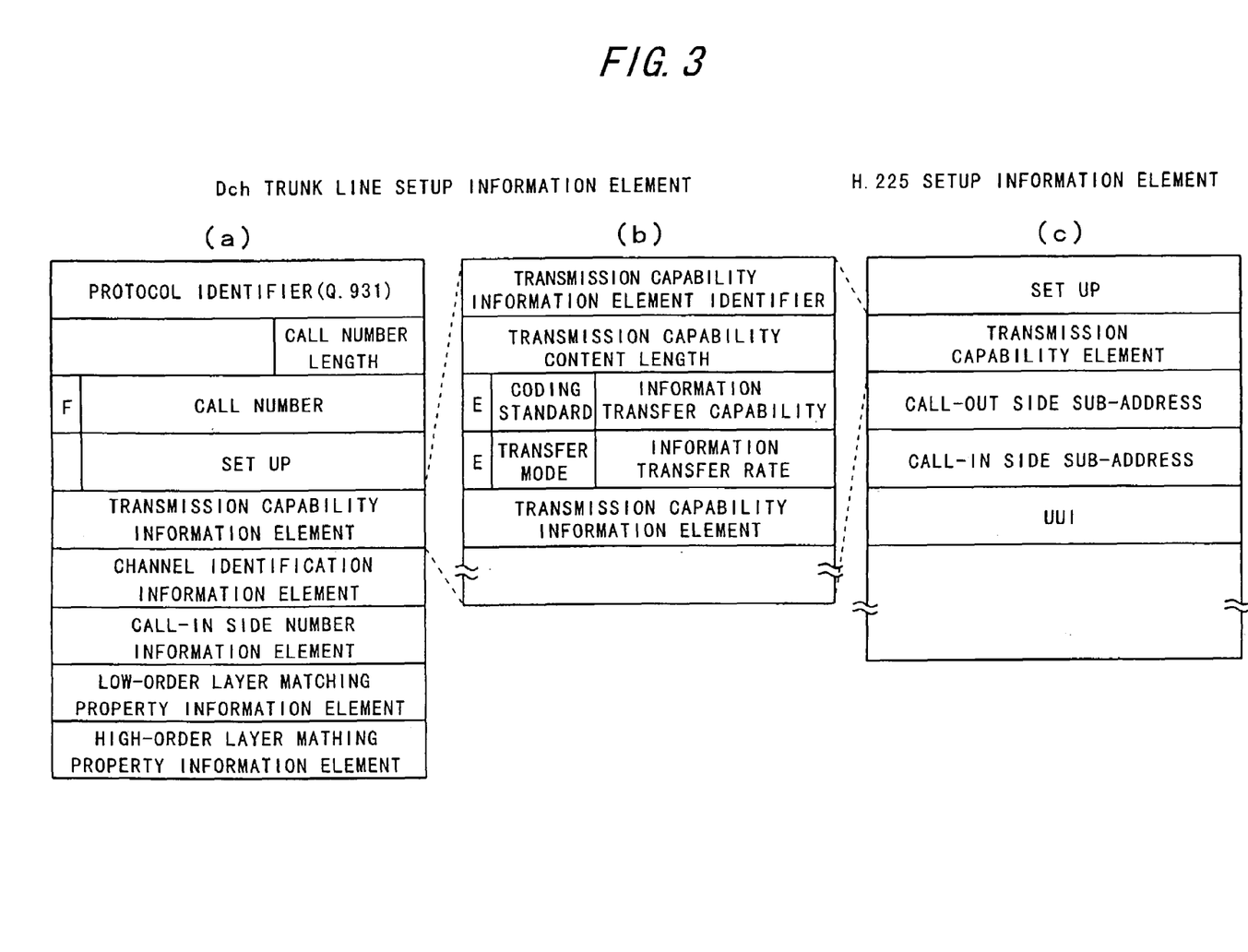
FIG. 3 is a chart for explaining a D-channel trunk line SETUP information element and an H. 255 SETUP information element.

When a terminal device on an call-out side is set in an off-hook state, and a selection number (telephone number) is input, a D-channel trunk line SETUP (see FIG. 3A) serving as a call setting request message is transmitted from the circuit switched network 1 to the GW 10.

When the D-channel trunk line controller 12 of the GW 10 receives the D-channel trunk line SETUP through the circuit I/F 11, the D-channel trunk line controller 12 gives an instruction based on the D-channel trunk line SETUP to the switching processor 13 and the signaling controller 14. The switching processor 13 and the signaling controller 14 acquire a B-channel having a compression form represented by each information element included in the D-channel trunk line SETUP, and perform connection process between the circuit switched network 1 and the GW 10 according to a predetermined circuit switching signaling procedure.

On the other hand, the D-channel trunk line controller 12 extracts a transmission capability information element (see FIG. 3B) from the D-channel trunk line SETUP and extracts information required to execute a signaling procedure based on H. 225 protocol between the GW 10 and the GW 20. The D-channel trunk line controller 12 gives the extracted transmission capability information element and the extracted information to the VoIP controller 16. The transmission capability information element includes information related to the CODEC form (including transmission rate) of sound data, as shown in FIG. 3B.

At this time, the VoIP controller 16 gives an instruction to the H. 225 signaling controller 17. In this manner, the H. 225 signaling controller 17 edits a message (see FIG. 3C) of H. 225 SETUP including a transmission capability information element to transmit the edited message to the GW 20 (the H. 225 signaling controller 17 corresponds to the notification section).

In this manner, the signaling procedure based on H. 225 protocol is executed between the GW 10 and the GW 20. At this time, when the GW 20 receives the H. 225 SETUP, a SETUP message including the transmission capability information element (see FIG. 3B) included in the H. 225 SETUP is edited, and the edited message is transmitted to the circuit switched network 2.

In this manner, in the GW 20, the B-channel compression/expansion section 15 performs the signaling procedure based on the H. 225. The VoIP controller 16 and the D-channel trunk line controller 12 determine the CODEC form according to the transmission information element as a CODEC form of sound data transmitted from the GW 20 to the circuit switched network 2 (the VoIP controller 16 and the D-channel trunk line controller 12 correspond to the determination section). The D-channel trunk line controller 12 causes the switching processor 13 and the signaling controller 14 to acquire a B-channel according to the transmission capability information element (determined CODEC form) and resources for control between the circuit switched networks 2 (the D-channel trunk line controller 12 corresponds to the setting section).

With the procedure described above, the CODEC form (compression form and transmission rate) of the sound data transmitted from the circuit switched network 1 to the GW 10 coincides with the CODEC form of the sound data transmitted from the GW 20 to the circuit switched network 2. However, it is a precondition that the circuit switched network 2 can expand sound data compressed according to "8-Kbps linear compression".

Figure 4:
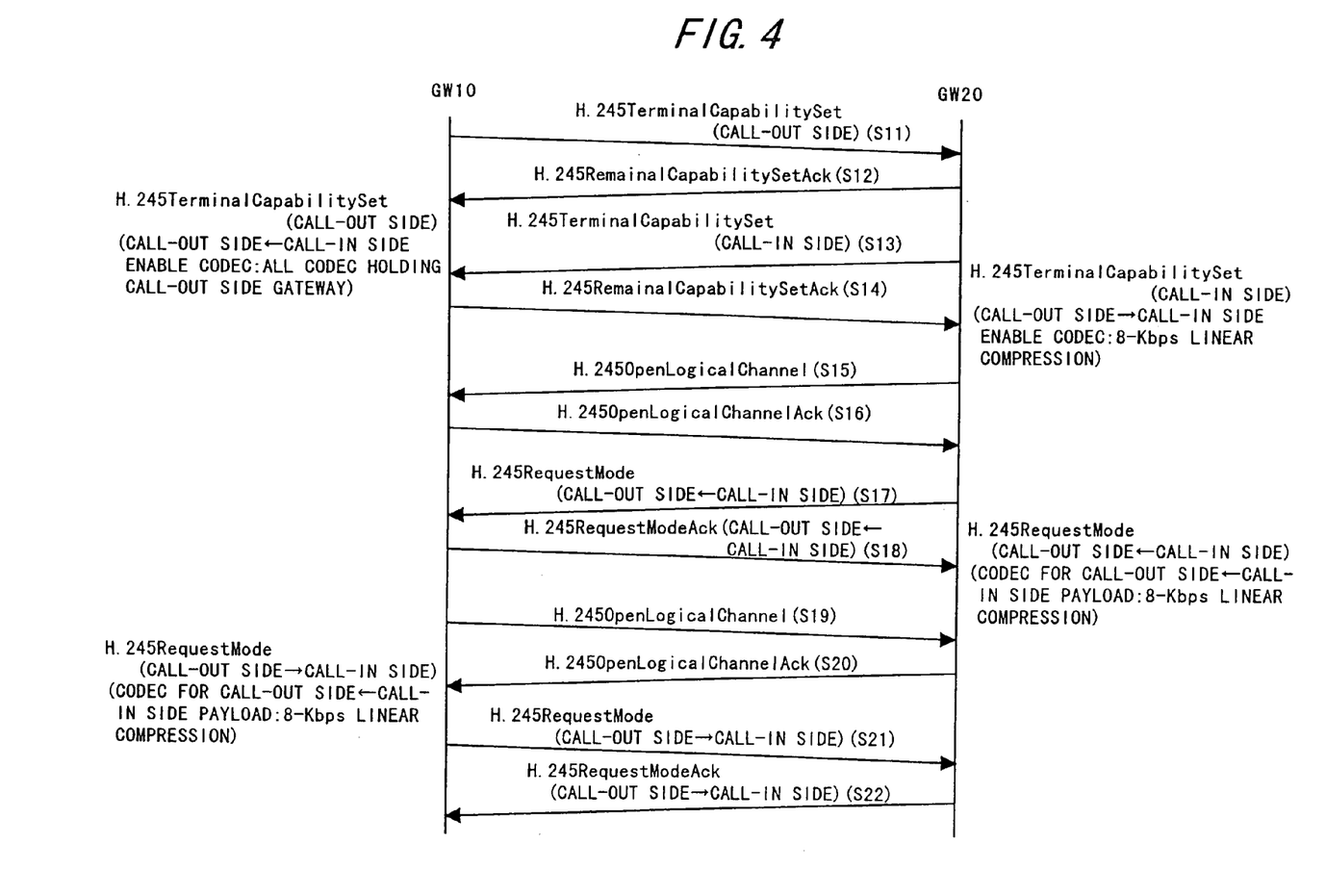
FIG. 4 is a sequence chart showing a capability exchange procedure based on H. 255 between the gateway apparatuses shown in FIG. 1.

Upon completion of the signaling procedure based on H. 225 between the GW 10 and the GW 20, the VoIP controller 16 gives an instruction to the H. 245 controller 18, and the H. 245 controller 18 performs a capability exchange procedure based on H. 245 protocol between the GW 10 and the GW 20. FIG. 4 is a sequence chart showing the capability exchange procedure performed between the GW 10 and the GW 20. Only a CODEC form (including compression/expansion method and transmission rate) in capability information will be described below.

As shown in FIG. 4, first, the GW 10 transmits a message (H. 245 Terminal Capability Set (call-out side)) including a CODEC form which can be executed by the GW 10 (step S11). It is assumed that the CODEC form which can be executed by the GW 10 does not include the same CODEC form as the CODEC form of the sound data transmitted from the circuit switched network 1 to the GW 10.

When the GW 20 receives a message including the CODEC form of the GW 10, the GW 20 transmits a massage (H. 245 Remainal Capability Set Ack) of an acknowledge (step S12).

The GW 20 transmits a message (H. 245 Terminal Capability Set (call-in side)) including a CODEC form which can be executed by the GW 20 (step S13). At this time, the GW 20 transmits a CODEC form which can be executed by the GW 20 and is included in the transmission capability information element in the H. 225 SETUP received in the H. 225 signaling procedure to the GW 10 as the CODEC form which can be executed by the GW 20 (the GW 20 corresponds to the second notification section).

For example, when a CODEC form of sound data transmitted between the circuit switched network 1 and the GW 10 is 8-Kbps linear compression, the transmission capability information element (see FIG. 3C) of the H. 225 SETUP includes information related to "8-Kbps linear compression". At this time, when the CODEC form which can be executed by the GW 20 includes "8-Kbps linear compression", the GW 20 notifies the GW 10 of "8-Kbps linear compression" as a CODEC form which can be executed by the GW 20.

When the GW 10 receives a message including the CODEC form of the GW 20, the GW 10 transmits an acknowledge message (H. 245 Remainal Capability Set Ack) (step S14).

When the GW 20 receives the acknowledge message from the GW 10, the GW 20 transmits a connection message (H. 245 Open Logical Channel) of a control channel related to H. 245 (step S15).

When the GW 10 receives the connection message, the GW 10 transmits an acknowledge message (H. 245 Open Logical Channel Ack) (step S16).

When the GW 20 receives the acknowledge message from the GW 10, the GW 20 selects, as a CODEC form of sound data (payload) transferred along a downward direction (GW 10←GW 20), a CODEC form (8-Kbps linear compression) which can be executed by the GW 10 and is included in the transmission capability information element in the H. 225. SETUP is received from the GW 20. The GW 20 transmits a message (H. 245 Request Mode (call-out side←call-in side)) included in the selection result (step S17).

When the GW 10 receives the message including the selection result, the GW 10 transmits an acknowledge message (H. 245 Request Mode Ack (call-out side←call-in side)) of the message (step S18). Thereafter, the GW 10 transmits a connection message (H. 245 Open Logical Channel) for connecting a control channel related to H. 245 (step S19).

When the GW 20 receives the connection message, the GW 20 transmits an acknowledge message (H. 245 Open Logical Channel Ack) corresponding to the connection message (step S20). In this manner, a control channel related to H. 245 in the upward direction (GW 10→GW20) is set between the GW 10 and the GW 20.

When the GW 10 receives the acknowledge message from the GW 20, the GW 10 selects a CODEC form which can be executed by the GW 20 as a CODEC form of sound data (payload) transmitted from the GW 10 to the GW 20 (the GW 10 corresponds to the setting section and the selection section). The GW 10 transmits a message (H. 245 Request Mode (call-out side→call-in side)) including the selection result (step S21).

When the GW 20 receives the message including the selection result, the GW 20 transmits an acknowledge message (H. 245 Request Mode Ack (call-out side→call-in side)) of the message (step S22). This acknowledge message is received by the GW 10.

Upon completion of the capability exchange procedure based on H. 245, the VoIP controller 16 (see FIG. 2) of the GW 10 checks whether the CODEC form (compression form and transmission rate) of sound data (in-band information) transmitted from the circuit switched network 1 to the GW 10 coincides with the CODEC form of sound data (payload) transmitted from the GW 10 to the GW 20. In this operation, both the CODEC forms coincide with each other with respect to "8-Kbps linear compression".

The VoIP controller 16 gives the coincidence of the CODEC forms to the D-channel trunk line controller 12 of the GW 10. The D-channel trunk line controller 12 sets the B-channel compression/expansion controller 15 in a mode in which an expansion process is not performed to upward sound data (the D-channel trunk line controller 12 corresponds to the controller and the second controller). On the other hand, the VoIP controller 16 sets the VoIP compression/expansion section 21 in a mode in which a compression process to upward sound data (the VoIP controller 16 corresponds to the controller and the second controller). In this manner, thereafter, sound data (upward sound data) received from the circuit switched network 1 by the GW 10 is transmitted to the IP network 3 without performing of the expansion/compression process.

Similarly, the VoIP controller 16 of the GW 20 checks whether the CODEC form of sound data (payload) transmitted from the GW 10 to the GW 20 coincides with the CODEC form of sound data (in-band information) transmitted from the GW 20 to the circuit switched network 2. In this operation, both the CODEC forms coincide with each other with respect to "8-Kbps linear compression".

The VoIP controller 16 of the GW 20 gives the coincidence between the CODEC forms to the D-channel trunk line controller 12 of the GW 20. Thereafter, the VoIP controller 16 of the GW 20 sets the VoIP compression/expansion section 21 in a mode in which an expansion process is not performed to upward sound data (the VoIP controller 16 corresponds to the controller). On the other hand, the D-channel trunk line controller 12 of the GW 20 sets the B-channel compression/expansion section 15 in a mode in which a compression process to upward sound data (the D-channel trunk line controller 12 corresponds to the controller). In this manner, sound data (upward sound data) received from the GW 10 by the GW 20 is transmitted to the circuit switched network 2 without performing of the expansion/compression process.

Therefore, since time required for the expansion/compression process in each of the GWs 10 and 20 can be subtracted from the transmission time of sound data of the upward. The transmission time to sound data of the upward between the terminal devices can be shortened. Since the expansion/compression process of sound data of the upward can be omitted in each of the GWs 10 and 20. Process loads on the B-channel compression/expansion controller 15 and the VoIP compression/expansion controller 21 in each of the GWs 10 and 20 can be reduced.

In addition to the processes described above, when the CODEC form of sound data transmitted from the circuit switched network 2 to the GW 20 can be caused to coincide with the CODEC form of sound data transmitted from the GW 20 to the GW 10 with respect to "8-Kbps linear compression", as described above, the B-channel compression/expansion controller 15 and the VoIP compression/expansion section 21 of the GW 20 are set in a mode in which an expansion/compression process is not performed to downward sound data.

Similarly, when the CODEC form of sound data transmitted from the GW 20 to the GW 10 can be caused to coincide with the CODEC form of sound data transmitted from the GW 10 to the circuit switched network 1 with respect to "8-Kbps linear compression", the B-channel compression/expansion controller 15 and the VoIP compression/expansion section 21 of the GW 10 are set in a mode in which an expansion/compression process is not performed to downward sound data.

In this manner, in each of the GWs 10 and 20, since the expansion/compression process to the downward sound data is omitted, the transmission time of the downward sound data can be shortened, and process loads on the B-channel compression/expansion controller 15 and the VoIP compression/expansion controller 21 in each of the GWs 10 and 20 can be reduced.

<Second Operation>

In the first operation, the case wherein the GW 20 can cause the CODEC form of sound data transmitted from the GW 20 to the circuit switched network 2 to coincide with the CODEC form of sound data transmitted from the circuit switched network 1 to the GW 10 according to the transmission capability information element in the H. 225 SETUP has been described.

However, the GW 20 may not be able to cause both the CODEC forms to coincide with each other. In this case, the GW 20 determines one of the CODEC forms that can be executed by the GW 10 and GW 20. The circuit switched network 2 as the CODEC form of data transmitted from the GW 20 to the circuit switched network 2 (the GW 20 corresponds to the determination section).

For example, as a result of the H. 225 signaling procedure, the CODEC form of the sound data transmitted from the circuit switched network 1 to the GW 10 is "8-Kbps linear compression". However, it is assumed that "16-Kbps linear compression" is determined as the CODEC form of the sound data transmitted from the GW 20 to the circuit switched network 2.

In this case, a capability exchange procedure based on H. 245 shown in FIG. 4 is as follows. In step S13, the GW 20 checks whether the CODEC form of the sound data transmitted from the circuit switched network 1 to the GW 10 coincides with the CODEC form of the sound data transmitted from the GW 20 to the circuit switched network 2.

At this time, if the CODEC forms coincides with each other, the same operation as Operation 1 described above is performed. In contrast to this, as in this operation, if the CODEC forms do not coincide with each other, the GW 20 compares the two CODEC forms with each other to select a CODEC form including a low transmission rate (transmission band). The GW 20 transmits a message including "8-Kbps linear compression" to the GW 10 as a CODEC form that can be executed by the GW 20 (the GW 20 corresponds to the second notification section).

Thereafter, in step S17, the GW 20 transmits a message including the effect that "8-Kbps linear compression" is selected as a CODEC form in the downward direction on the IP network 3 to the GW 10.

Thereafter, in step S21, the GW 10 transmits a message including the effect that "8-Kbps linear compression" is selected as a CODEC form in an upward direction on the IP network 3 to the GW 20.

Upon completion of the capability exchange procedure based on H. 245, in the GW 10, as in Operation 1, the B-channel compression/expansion section 15 is set in a mode in which upward sound data is not expanded. The VoIP compression/expansion section 21 is set in a mode in which upward sound data is not compressed.

In contrast to this, in the GW 20, the VoIP compression/expansion section 21 is set in a mode in which the upward sound data (payload compressed by "8-Kbps linear compression") is expanded. The B-channel compression/expansion section 15 is set in a mode in which the sound data expanded by the VoIP compression/expansion section 21 is compressed by a "16-Kbps linear compression" form.

Therefore, in the GW 10, as in Operation 1, the upward sound data is transmitted to the IP network 3 without being subjected to an expansion/compression process. However, in the GW 20, sound data compressed by "8-Kbps linear compression" is expanded and compressed by "16-Kbps linear compression", and then transmitted to the circuit switched network 2.

Also, in this case, since an expansion/compression process in the GW 10 can be omitted, transmission time of sound data can be shortened, a process load on the GW 10 can be reduced.

<Operation 3>

In Operation 2, the following case has been described. That is, as a result of the H. 225 signaling procedure, the CODEC form of the sound data transmitted from the circuit switched network 1 to the GW 10 is "8-Kbps linear compression". The CODEC form of the sound data transmitted from the GW 20 to the circuit switched network 2 is "16-Kbps linear compression".

In contrast to this, the following case may occur. That is, although the CODEC form of the sound data transmitted from the circuit switched network 1 to the GW 10 is "16-Kbps linear compression", the CODEC form of the sound data transmitted from the GW 20 to the circuit switched network 2 is "8-Kbps linear compression".

In this case, an H. 245 capability exchange procedure shown in FIG. 4 is the same as that in Operation 2. More specifically, in step S13, the GW 20 compares the two CODEC forms described above to select a CODEC form having a low transmission rate (transmission band). The GW 20 transmits a message including "8-Kbps linear compression" to the GW 10 as a CODEC form that can be executed by the GW 20.

Thereafter, in step S17, the GW 20 transmits a message including the effect that "8-Kbps linear compression" is selected as a CODEC form in a downward direction on the IP network 3 to the GW 10.

Thereafter, in step S21, the GW 10 transmits a message including the effect that "8-Kbps linear compression" is selected as a CODEC form in an upward direction on the IP network 3 to the GW 20.

In this manner, upon completion of the H. 245 capability exchange procedure, in the GW 10, the B-channel compression/expansion section 15 is set in a mode in which upward sound data (in-band information compressed by 16-Kbps linear compression) is expanded. The VoIP compression/expansion section 21 is set in a mode in which sound data expanded by the B-channel compression/expansion section 15 is compressed by the "8-Kbps linear compression" form.

In contrast to this, in the GW 20, as in Operation 1, the B-channel compression/expansion section 15 is set in a mode in which upward sound data is not expanded. The VoIP compression/expansion section 21 is set in a mode in which upward sound data is not compressed.

Therefore, in the GW 10, the upward sound data compressed by "16-Kbps linear compression" is expanded and compressed by "8-Kbps linear compression" to be transmitted to the IP network 3. However, in the GW 20, as in Operation 1, the upward sound data is transmitted to the circuit switched network 2 without being subjected to an expansion/compression process.

Also, in this case, since an expansion/compression process in the GW 20 can be omitted, transmission time of sound data can be shortened, and a process load on the GW 20 can be reduced.

The processes in Operations 1 to 3 described above may be performed in only a case wherein sound data received from the circuit switched network 1 or 2 of each of the GWs 10 and 20 is compressed.

What is claimed is:

1. A gateway apparatus, arranged between an internet protocol network and a circuit switched network, for transmitting data received from the internet protocol network to the circuit switched network, comprising:

an expansion section for expanding compressed data received from the internet protocol network;

a compression section for coin pressing the data expanded by the expansion section;

a setting section setting a compression form for compressing the data being transmitted to the circuit switched network, wherein the compression form includes a transmission rate;

a judging section judging whether the compression form set by said setting section coincides with the compression form of the compressed data received from the internet protocol network or not; and a controller performing control such that when the compression forms judged by the judging section do not coincide, the compressed data received from the internet protocol network is expanded by said expansion section, the expanded data expanded by said expansion section is compressed by said compression section at the compression form set by said setting section, and the compressed data compressed by said compression section is transmitted to the circuit switched network, and when the compressed forms are judged to coincide, the compressed data received from the internet protocol network is transmitted to the circuit switched network without processing by said expansion section and said compression section.

2. A network system comprising a first gateway apparatus to which a first circuit switched network is connected, a second gateway apparatus to which a second circuit switched network is connected, and an internet protocol network to which the first gateway apparatus and the second gateway apparatus are connected, wherein the first gateway apparatus comprising:

a notification section giving information of a CODEC form of compressed data, transmitted from the first circuit switched network to the first gateway apparatus, to the second gateway apparatus as CODEC information when compressed data is transmitted from the first circuit switched network to the second circuit switched network through the internet protocol network; and a selection section selecting a compression form of the compressed data transmitted from the first gateway apparatus to the second gateway apparatus from information of CODEC forms which are received from the second gateway apparatus and can be executed by the second gateway apparatus, the second gateway apparatus comprising:

an expansion section expanding the compressed data received from the first gateway apparatus;

a compression section compressing data expanded by the expansion section;

a determination section, when a CODEC form corresponding to the CODEC information received from the notification section can be executed by the second gateway apparatus and when compressed data compressed in the CODEC form can be expanded by the second circuit switched network, determining a compression form corresponding to the CODEC information as a compression form of compressed data transmitted from the second gateway apparatus to the second circuit switched network;

a second notification section giving only information of the CODEC form determined by the determination section to the first gateway apparatus as information of a CODEC form which can be executed by the second gateway apparatus;

a judging section judging whether the compression form selected by the selection section of the first gateway apparatus, for transmitting compressed data from the first gateway apparatus to the second gateway apparatus, coincides with the compression form selected by said determination section for transmitting compressed data from the second gateway apparatus to the second circuit switched network; and a controller performing control such that when the compression forms judged by said judging section do not coincide, the compressed data received from the first gateway apparatus is expanded by said expansion section, the expanded data expanded by said expansion section is compressed by said compression section at the compression form set by said determination section, and the compressed data compressed by said compression section is transmitted to the second circuit switched network, and when the compressed forms are judged to coincide, the compressed data received from the first gateway apparatus is transmitted to the second circuit switched network without processing by said expansion section and said compression section.

3. A network system according to claim 2, wherein the first gateway apparatus further comprising:

a second expansion section expanding compressed data received from the first circuit switched network;

a second compression section compressing the data expanded by the second expansion section; and a second controller transmitting the compressed data received from the first circuit switched network to the internet protocol network without being subjected to expansion/compression processes by the second expansion section and the second compression section when the compression form of the compressed data transmitted from the first circuit switched network to the first gateway apparatus coincides with the compression form selected by the selection section for the compressed data transmitted from the first gateway apparatus to the second gateway apparatus.

4. A network system according to claim 2, wherein when the determination section cannot decide a CODEC form corresponding to the CODEC information received from the notification section as a compression form of compressed data transmitted from the second gateway apparatus to the second circuit network, the determination section determines a CODEC form of data which can be executed by the second gateway apparatus and expanded by the second circuit switched network as the compression form of the compressed data transmitted from the second gateway apparatus to the second circuit switched network, and the second notification section gives, of the CODEC form notified by the notification section and the CODEC form determined by the determination section, only information of the CODEC form in which the transmission rate of the compressed data is low to the first gateway apparatus as information of a CODEC form which can be executed by the second gateway apparatus.

5. A network system according to claim 3, wherein when the determination section cannot determine a CODEC form corresponding to the CODEC information received from the notification section as a compression form of compressed data transmitted from the second gateway apparatus to the second circuit switched network, the determination section determines a CODEC form of data which can be executed by the second gateway apparatus and expanded by the second circuit switched network as the compression form of the compressed data transmitted from the second gateway apparatus to the second circuit switched network, and the second notification section gives, of the CODEC form notified by the notification section and the CODEC form determined by the determination section, only information of the CODEC form in which the transmission rate of the compressed data is low to the first gateway apparatus as information of a CODEC form which can be executed by the second gateway apparatus.

* * * * *

UNITED STATES PATENT AND TRADEMARK OFFICE
CERTIFICATE OF CORRECTION

PATENT NO.        : 7,272,135 B1                                     Page 1 of 1
APPLICATION NO.   : 09/431902
DATED             : September 18, 2007
INVENTOR(S)       : K. Ohtsu It is certified that error appears in the above-identified patent and that said Letters Patent is hereby corrected as shown below:

Claim 1 column 14, line 28: "for coin pressing" should be indicated as
-- for compressing --.

Signed and Sealed this

Eighteenth Day of March, 2008

JON W. DUDAS
*Director of the United States Patent and Trademark Office*